July 2, 1929.  I. STERN  1,719,314
DENTURE ATTACHMENT
Filed Sept. 2, 1926
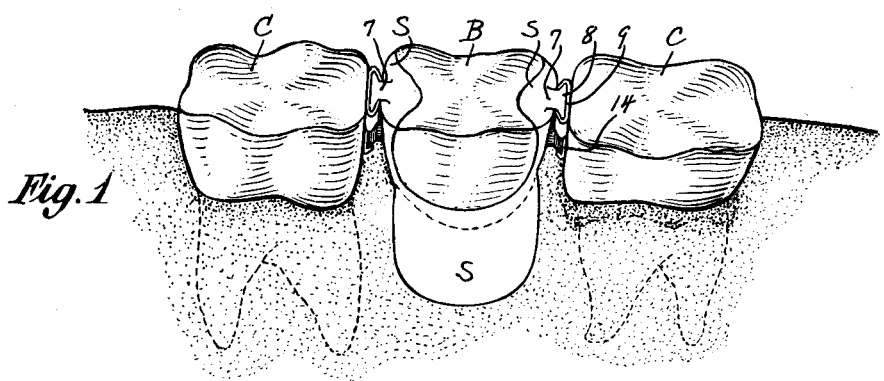
Fig.1
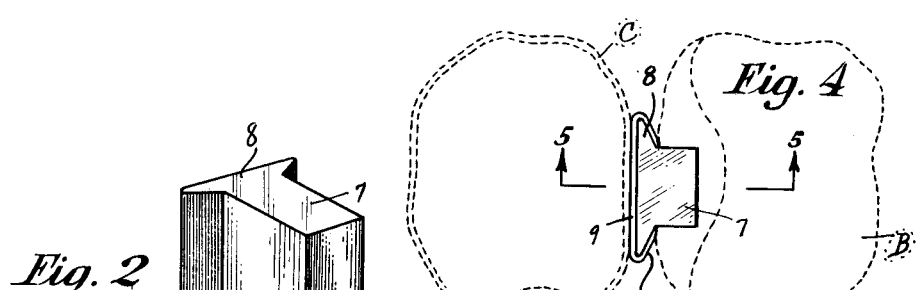
Fig.2
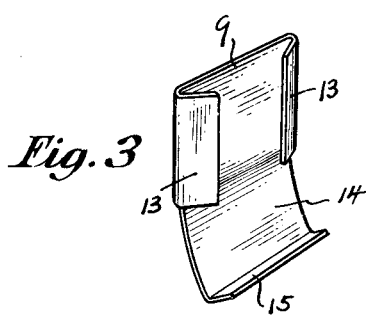
Fig.3
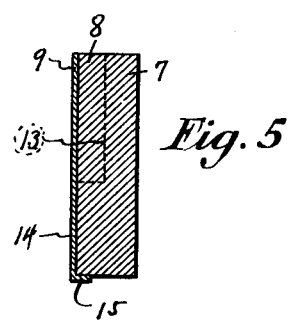
Fig.4
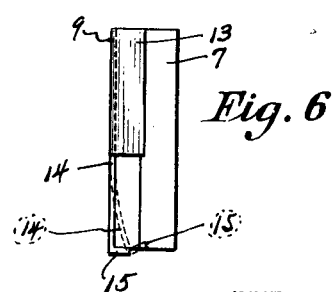
Fig.5
Fig.6
INVENTOR
ISIDORE STERN
BY
Bohleber & Ledbetter
ATTORNEYS Patented July 2, 1929.

1,719,314

UNITED STATES PATENT OFFICE.

ISIDORE STERN, OF NEW ROCHELLE, NEW YORK.

DENTURE ATTACHMENT.

Application filed September 2, 1926. Serial No. 133,123.

This invention relates to dentistry and more particularly to improvements in adjustable denture attachments for use in connection with removable bridgework.

In dental restorative work where a removable bridge is employed, it is desirable to mount a denture receiving socket on or in the sound tooth and employ it as a pier tooth to support the bridge, and a bridge support forming a part of the bridge itself removably fits into the pier tooth socket and thus the bridge is removably carried in the edentate space between two natural teeth.

An object of my invention is to produce an adjustable denture attachment for use in building up a superior type of removable bridgework and which attachment comprises a novel combination socket and denture anchorage member.

A further purpose is to produce combination attachment comprising an adjustable socket and a denture attachment received thereinto wherein the socket itself is the adjustable element so as to take up for wear and snugly receive the denture head, and so that the bridge support or attachment itself is not handicapped in its structural arrangement with spring adjusting means.

Furthermore, it is an object to produce an adjustable denture attachment well or especially designed for use in connection with crowned pier teeth where the restorative removable bridge is to be swung between crowned pier teeth rather than between pier teeth of the socketed inlay type.

The accompanying drawing illustrates one example of my invention, wherein:

Figure 1 shows a general assembly view of a removable bridgework restoration within the mouth and illustrates two spaced natural teeth adapted as crowned pier teeth between which a removable bridge is mounted.

Figures 2 and 3 illustrate the adjustable denture attachment parts comprising a head shown in Figure 2 and an adjustable socket shown in Figure 3.

Figure 4 illustrates a plan view of the cooperating socket and denture head shown in connection with a dotted line crowned pier tooth and bridge.

Figure 5 illustrates a longitudinal crosssectional view taken on the line 5—5 of Figure 4 illustrating the denture mounted in the socket.

Figure 6 illustrates a side elevation of the denture head or bridge support mounted in the socket before the parts are mounted on a bridge and crown.

Referring first to Figure 1 for a general understanding of bridgework with which my new denture attachment may be used there is shown crowned natural teeth C utilized as pier teeth between which is swung a bridge B. The bridge comprises an artificial porcelain tooth B fixed within the gold saddle S and the saddle provides means for soldering or integrally joining thereto a shank 7 of a denture head 8 which slidably fits into an adjustable socket 9. The bridge B is removed from the crown pier teeth C by lifting it vertically from the socket 9 and after wear the socket is capable of being adjusted by bending its spring means to be described in relation to the main body of the socket so as to make the bridge denture head 8 thereafter fit more tightly into the crowned pier socket 9.

Gold crowns C cover the spaced pier teeth and provide a soldering base or means by which the sockets 9 are secured to said teeth. The sides of the crowns C adjacent the edentate space to be bridged may be filed or smoothed down, or may in fact be cut into, so as to set the socket 9 into or against the wall of the crown C whereupon the sockets 9 are soldered thereto. In this way the sockets 9 become a fixed part of the crowned pier teeth C and remain permanently on the crowns while the bridge B is removed and replaced at will.

Referring further to the invention, namely the receiving socket and denture attachment, there is shown a denture attachment comprising a shank 7 including an integral head 8. The denture part 7—8 is made of gold or other suitable alloy metal and it may be cut down or trimmed as to its length or height so as to adapt it to the particular character of work at hand. This denture attachment may be made T-shaped if desired.

The head 8 on the denture attachment is made in any suitable form and an important feature of the invention relates to the novel means by which I employ a denture head 7—8 not having spring adjustment means made thereon and wherein the adjustment feature is attained by adjusting the socket itself into which the head is removably received.

Referring now to the construction of the socket there is shown a socketed member comprising a back plate 9 having vertical side parallel walls 13 standing rigidly thereon. The socket wall 9 projects below the side walls 13 to form an adjustable wing or pressure plate 14 on the lower end of which is formed a stop or foot 15. The socket 9 is preferably made of spring or tempered metal and the angular side walls 13 are not necessarily intended for adjustment purposes since they are pressed in suitable form during the process of manufacturing the socket and intended to be left in that position to receive the attachment head 8.

As to adjustment of the socket to take up for wear and to maintain a tight fit between the support member 7—8 and socket, it is the downwardly projecting spring plate 14 which is primarily designed for adjustment purposes. This is accomplished by subjecting the spring plate 14 to a slight outward distortion or by giving it a permanent bend thus setting it at an angle to the back wall 12. It follows that the denture attachment head 8 is easily received into the socket 9—13 but the spring plate 14 resists final sliding movement of the denture head 8 into the socket so that by thrusting the bridge into position to overcome the tension of the spring plate 14 it follows that the denture is held positively within the socket as shown in Figure 5 and other views by reason of the continuous pressure of the socket against the support. Figure 6 shows in dotted outline that the spring plate 14 is pushing against the denture head 8.

After considerable use, especially if the bridge be frequently removed and replaced, it will be found that the bridge B is relatively loose on its pier teeth C. Such being the case the spring plate 14 may be bent slightly outwardly in relation to the crown teeth C. This is carried out by inserting a blade between the wall of the crown C and the back surface of the spring plate 14 whereupon the plate 14 is pried or bent outwardly to engage against the head 8 with increased spring pressing contact. Adjustment is seldom required once the dentist has completed his work and properly set the spring plate 14 to perform its function.

The stop 15 limits the position of the support head 8 in that the head rests on the foot at the lower end of the spring. The top of the bridge, its saddle, the support, the socket, and the crown all cooperate to form the occlural surface of the restorative work. The invention is well adapted to crown and bridgework.

What I claim is:

1. A denture attachment comprising in combination, a bridge support including a head and shank, and a socket including a spring extension projecting below the socket and adapted to bear against the head.

2. A denture attachment comprising in combination, a bridge support including a head and shank, a socket including a spring extension projecting below the socket and adapted to bear against the head, and a stop included on the free end of the spring extension beneath the socket to limit the depth which the head fits into the socket.

3. A denture attachment comprising in combination, a socket member including a plate one end of which carries socket forming walls, and the other end of which forms a resilient spring, a bridge support member including a head to fit into the socket and a shank to anchor to a bridge, and a stop included on the lower end of the spring outside of the socket and against which rests the lower end of the head.

4. A denture attachment comprising, a socket which includes an integral spring plate therebeneath, and a bridge support including a head to fit into the socket which head is about equal in length to the combined socket and spring plate.

5. A denture attachment comprising, a socket which includes an integral spring plate therebeneath, a bridge support including a head to fit into the socket which head is about equal in length to the combined socket and spring plate, and the lower end of the plate turned at right angles thereto forming a stop against which the head rests.

In testimony whereof I affix my signature.

ISIDORE STERN.